(12) United States Patent
Rinehart et al.

(10) Patent No.: US 7,522,403 B1
(45) Date of Patent: Apr. 21, 2009

(54) HIGH CURRENT-LOAD FILM CAPACITOR ASSEMBLY

(75) Inventors: Lawrence E. Rinehart, West Linn, OR (US); Guillermo L. Romero, Phoenix, AZ (US)

(73) Assignee: Rinehart Motion Systems, LLC, Wilsonville, OR (US)

( * ) Notice: Subject to any disclaimer, the term of this patent is extended or adjusted under 35 U.S.C. 154(b) by 400 days.

(21) Appl. No.: 11/387,098

(22) Filed: Mar. 21, 2006

(51) Int. Cl.
*H01G 4/005* (2006.01)

(52) U.S. Cl. .................. 361/303; 361/302; 361/305; 361/518; 361/519; 361/530

(58) Field of Classification Search ............... 361/303, 361/302, 305, 502–504, 508–512, 516–519, 361/536–537, 330, 301.3
See application file for complete search history.

(56) References Cited

U.S. PATENT DOCUMENTS

| 4,245,277 | A | * | 1/1981 | van Gils et al. ............. 361/521 |
| 5,381,301 | A | * | 1/1995 | Hudis ....................... 361/275.2 |
| 5,666,269 | A | * | 9/1997 | Romero et al. .............. 361/699 |
| 5,673,168 | A | * | 9/1997 | Efford et al. ................ 361/518 |
| 5,793,603 | A | * | 8/1998 | Lyman ....................... 361/503 |
| 6,178,082 | B1 | * | 1/2001 | Farooq et al. ............... 361/303 |
| 6,430,024 | B1 | * | 8/2002 | Gernert ....................... 361/302 |
| 6,778,378 | B1 | * | 8/2004 | Andelman ................... 361/302 |

* cited by examiner

*Primary Examiner*—Nguyen T Ha
(74) *Attorney, Agent, or Firm*—Timothy E. Siegel Patent Law, PLLC

(57) ABSTRACT

A multilayer polymer film capacitor block, adapted to accept high currents. At least one multilayer polymer film capacitor is fit into a cavity defined in a rigid, thermally conductive structure. The cavity is sized and shaped to receive said multilayer polymer film capacitor when said capacitor is at a temperature below 40° C., but fitting said capacitor in a conformal manner so that as said capacitor is raised to temperatures above 40° C., said cavity constrains expansion of said capacitor.

15 Claims, 3 Drawing Sheets

HIGH CURRENT-LOAD FILM CAPACITOR ASSEMBLY

BACKGROUND OF THE INVENTION

When converting electric power from one form to another, it is frequently necessary to switch back and forth to produce an AC current of a particular frequency. Sometimes this is an intermediate step to create a DC current at a desired voltage level, in other situations an AC current is the desired output.

When periodic electrical switching is performed at a frequency on the order of 60 Hz and with a current in the range of 5 Amps to 50 Amps, it is necessary to employ capacitors in the range of 200 to 1,000 micro Farads to absorb and smooth the ripple current produced by the circuit inductance. A natural choice for this application is the multi-layer polymer (MLP) capacitor. An MLP capacitor with capacitance of 300 micro Farads can be built having modest physical dimensions (about 300 cm$^3$) and having a low ($\leq 4\Omega$) equivalent series resistance (ESR). A low ESR is important to prevent the capacitor from heating up too much during high-current operation.

Unfortunately, as large enough currents are routed through a MLP capacitor, the capacitor does heat up, despite the low ESR. This causes the water present in the MLP capacitor to expand, eventually causing the metal housing of the capacitor to buckle, if the temperature gets too high (>81° C.). One technique for addressing this problem is to clamp the MLP capacitor. This, however, requires that pressure be applied evenly over the exterior wall having the greatest extent, requiring some careful adjustment of the clamping mechanism, sometimes involving the use of springs to measure the pressure exerted on various parts of the exterior wall. Another practice is to heat sink or otherwise cool the MLP capacitor.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention takes the form of a method of operating a multi-layer polymer (MLP) capacitor having a rated current. The method utilizes a rigid, thermally conductive structure, defining a cavity shaped like that of the MLP capacitor and being sized to be just large enough to accept the MLP capacitor when the MLP capacitor is at a temperature of below 40° C. The MLP capacitor is placed in the cavity and is operated at an average current higher than the rated current, thereby causing the MLP capacitor to become hot and to expand, consequently making substantially conformal contact to the cavity. In a preferred embodiment, the structure defines tubes through which fluid coolant is pumped during operation.

In a second separate aspect, the present invention takes the form of a multilayer polymer film capacitor block, adapted to accept high currents. At least one multilayer polymer film capacitor is fit into a cavity defined a metal structure. The cavity is sized and shaped to receive the multilayer polymer film capacitor when the capacitor is at a temperature below 40° C., but fitting the capacitor in a conformal manner so that as the capacitor is raised to temperatures above 40° C., the cavity constrains expansion of the capacitor.

In a third separate aspect, the present invention takes the form of capacitance means, comprising multilayer polymer film (MLP) capacitance fit into cavity means by metal structural means. The cavity means is sized and shaped to receive the MLP capacitance means when the capacitance means is at a temperature below 40° C., but fits the MLP capacitance means in a conformal manner so that as the MLP capacitance means is raised to temperatures above 40° C., the cavity constrains expansion of the MLP capacitance means.

In a fourth separate aspect, the present invention takes the form of an electric power switching assembly, comprising a set of electric power switches and a multilayer polymer film capacitor block, adapted to accept high currents. The block includes at least one multilayer polymer film capacitor set into a cavity of a metal structure. The cavity is sized and shaped to receive the multilayer polymer film capacitor when the capacitor is at a temperature below 40° C., but fitting the capacitor in a conformal manner so that as the capacitor is raised to temperatures above 40° C., the cavity constrains expansion of the capacitor.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION OF THE PREFERRED EMBODIMENT(S)

Figure 1:
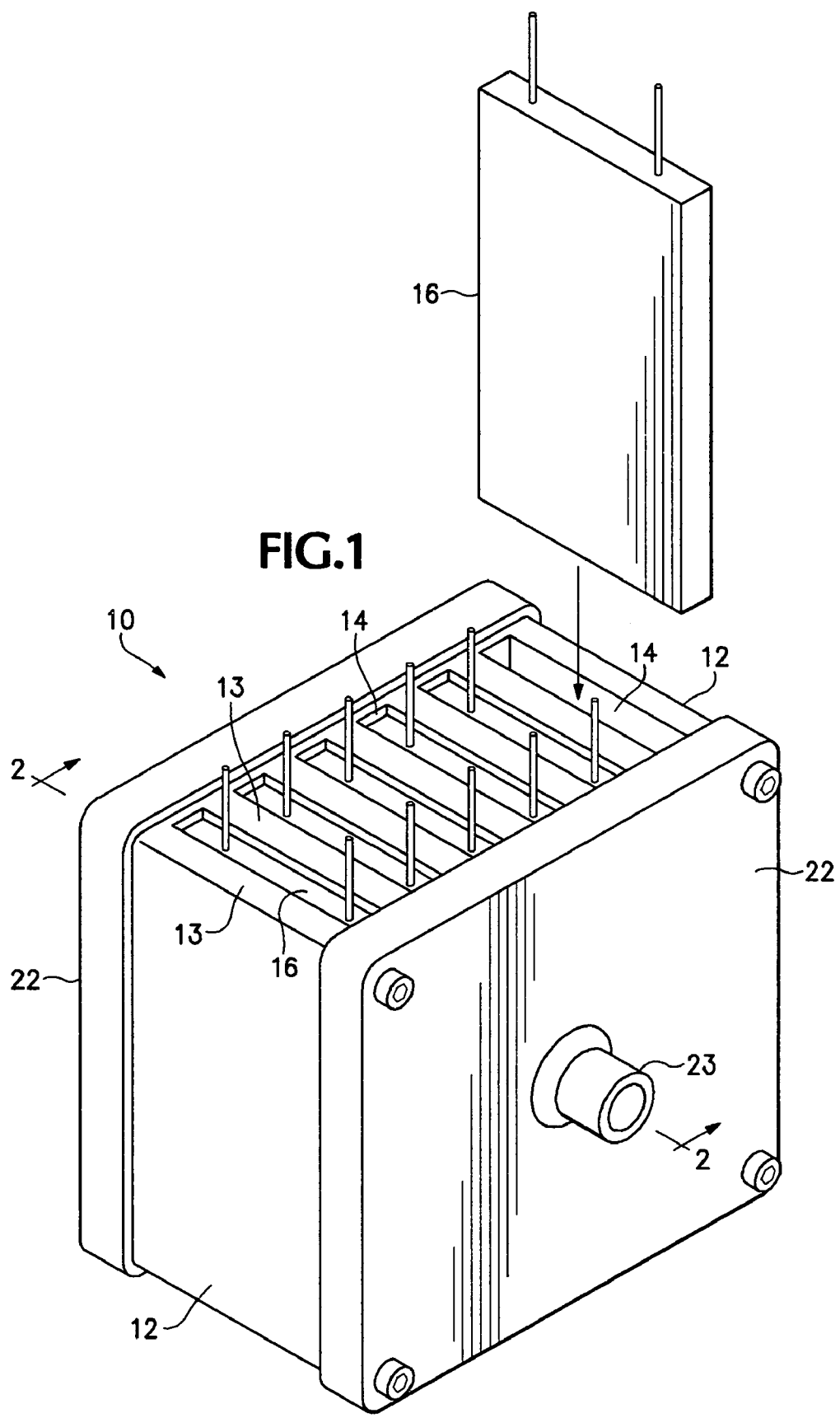
FIG. 1 is a perspective view of a preferred embodiment of capacitive assembly according to the present invention.

Referring to FIG. 1, a preferred embodiment of a capacitive assembly 10 includes a metal block 12 having a set of walls 13 defining a set of cavities 14 into which are snugly fit a set of MLP capacitors 16.

Figure 2:
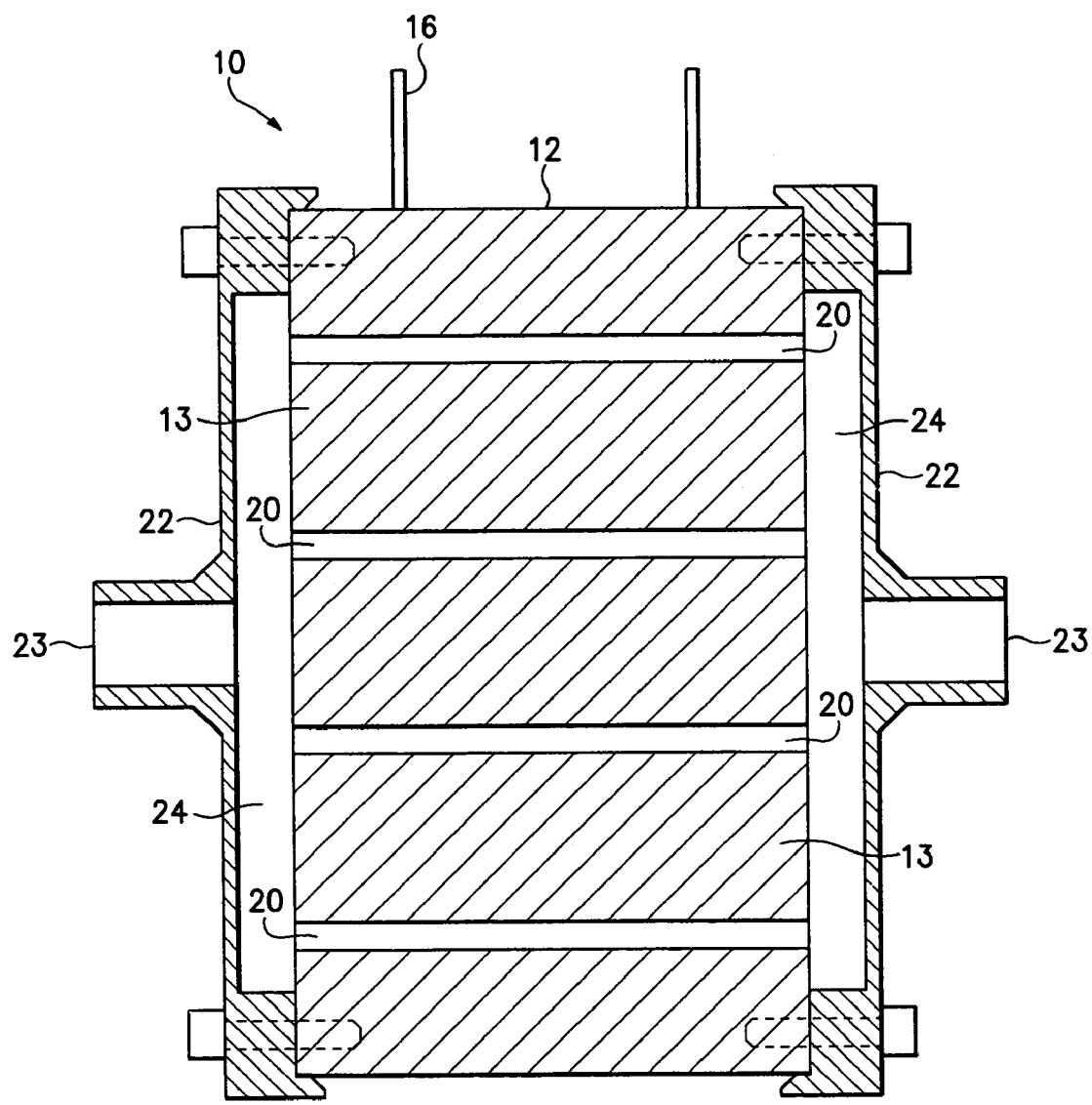
FIG. 2 is a sectional perspective view of the assembly of claim 1, showing interior detail.

Referring to FIG. 2, inside walls 13 a set of channels 20 are defined for transmitting liquid coolant past capacitors 16. A pair of endplates 22 define coolant ports 23. In conjunction with block 12, endplates 22 define a pair of void spaces 24 that permit the liquid coolant to enter and exit channels 20. A pump (not shown) is used to push the liquid coolant through channels 20 into and out of void spaces 24 and through channels 20.

In operation capacitors 16 may be operated at a ripple current substantially in excess of their rated capacity. This causes capacitors 16 to heat up and expand, thereby making conformal contact with the surfaces of cavities 14 (FIG. 1) and being constrained by cavities 14 (FIG. 1). The conformal contact results in excellent heat discharge characteristics so that capacitors 16 may reach a steady state in which heat is being generated and discharged at a comparatively high rate. During this high current operation, capacitors 16 are safeguarded against damage due to expansion by the rigidity of cavities 14 and are safeguarded against damage due to interior heat by the high rate of heat discharge made possible by the cooling system. It has been found that capacitors rated to be able to accept a 3 AMP ripple current without damage can accept an 18 AMP ripple current when constrained and cooled as disclosed in this application.

In greater detail, assembly 10 is 120.55 mm long, 86.55 mm high and 65.89 mm wide (not including coolant ports 23). The core block 12, defining cavities 14 and channels 20 is machined from a solid piece of metal, preferably aluminum or aluminum alloy. In an alternative preferred embodiment, core block 12 is cast or molded and may be formed of a rigid, thermally conductive polymer, such as carbon fiber filled Polyphenylene Sulphide (PPS) or liquid crystal polymer material. Cavities 14 are lined with 5 mm thick pockets of polymeric material, preferably that material which is available from Dupont Advanced Fiber Systems of Richmond, Va. under the trademark Nomex®. Capacitors 16 may be procured from Cornell Dubilier of Liberty, S.C. under the designation MLP 85° C. Flatpack, Ultra-Long Life, Aluminum, 330 micro Farad, 250 VDC. Coolant, such as water, an ethylene glycol water mixture or a propylene glycol water mixture may be pumped through at a rate of 2-4 liters per minute when the system is operated with a ripple current of about 20 AMPS.

Figure 3:
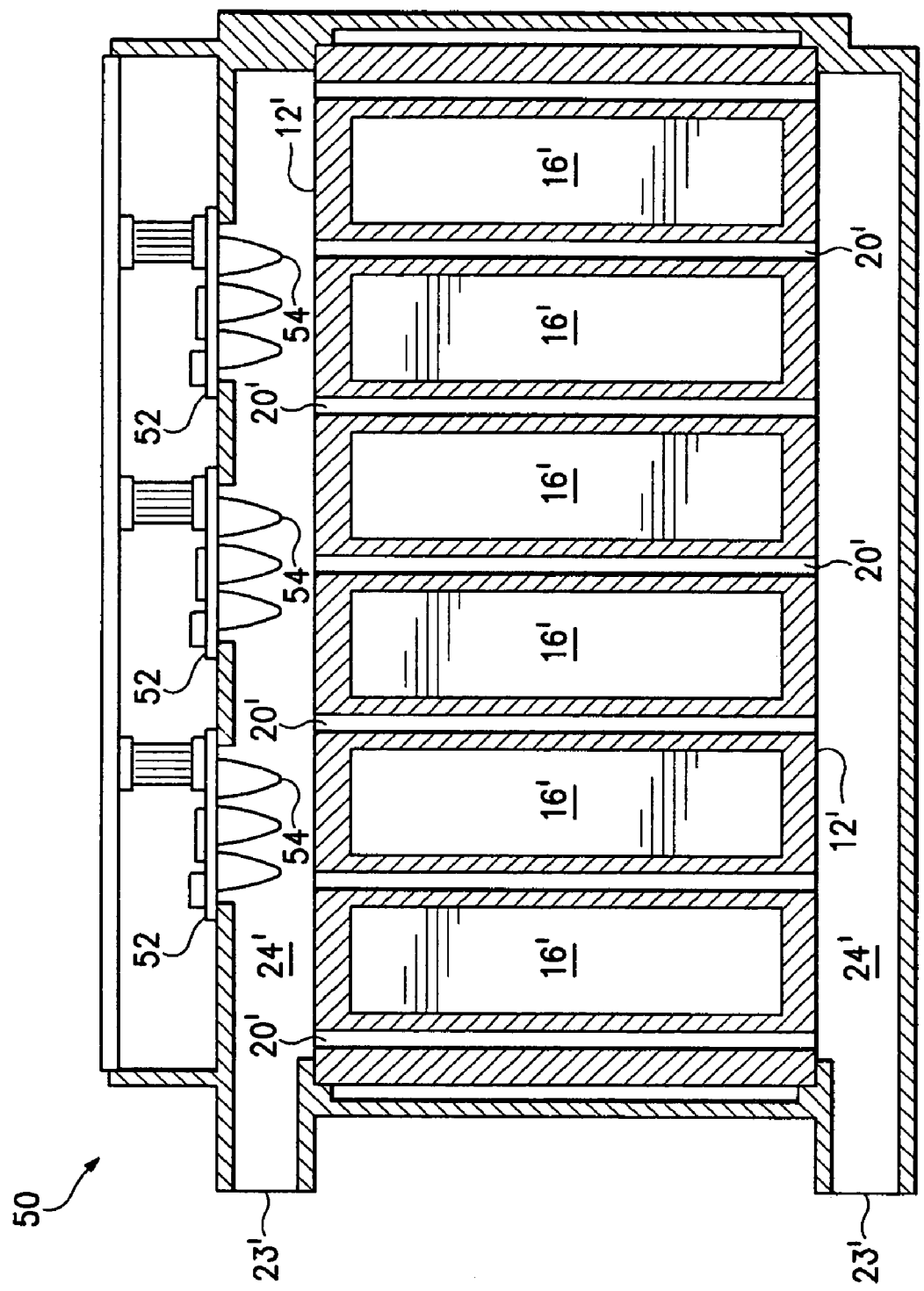
FIG. 3 is sectional perspective view of an alternative preferred embodiment of the present invention.

Referring to FIG. 3, in an alternative preferred embodiment 50 a set of electrical switches 52 is included in the same housing and shares the same cooling system as capacitive assembly block 12'. Cooling fins 54 help to transfer heat away from the switches 52. In similar operation to embodiment 10, coolant flows through ports 23', into cavities 24' and through channels 20', cooling capacitors 16' as well as fins 54, and thereby switches 52 in the process.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of operating a multi-layer polymer (MLP) capacitor having a rated current, comprising:
    (a) providing a rigid, thermally conductive structure, defining a cavity shaped like that of said MLP capacitor and being sized to be just large enough to accept said MLP capacitor when said MLP capacitor is at a temperature of below 40° C.;
    (b) placing said MLP capacitor in said cavity; and
    (c) operating said MLP capacitor at an average current higher than said rated current, thereby causing said MLP capacitor to become hot and to expand, consequently making substantially conformal contact to said cavity.

2. The method of claim 1, further including the step of fluid cooling said cavity to cool said MLP capacitor.

3. The method of claim 1, wherein said cavity is defined by a set of walls and wherein a fluid pathway is formed in at least one of said walls.

4. The method of claim 3, wherein fluid is pushed through said circuitous fluid pathway during operation of said capacitor.

5. The method of claim 3 wherein at least one additional fluid pathway is machined into at least one of said walls.

6. The method of claim 3, wherein said fluid is a liquid.

7. The method of claim 5, wherein said liquid includes water.

8. The method of claim 7, wherein said liquid is ethylene glycol mixed with water.

9. The method of claim 7, wherein said liquid is propylene glycol mixed with water.

10. The method of claim 1, wherein said MLP capacitor includes a metal jacket.

11. The method of claim 1, wherein said rigid, thermally conductive structure is made of metal.

12. The method of claim 11, wherein said metal is at least partly aluminum.

13. The method of claim 1, wherein said rigid, thermally conductive structure is made of polymer.

14. The method of claim 1, wherein said structure is machined from a solid metal blank.

15. The method of claim 1 wherein at least one additional cavity and at least one additional MLP capacitor is provided.

* * * * *